(12) United States Patent
Betts et al.

(10) Patent No.: US 11,097,662 B2
(45) Date of Patent: Aug. 24, 2021

(54) SIDE VIEW MIRROR

(71) Applicants: Kevin A. Betts, Wichita, KS (US);
Douglas P. Looney, Andover, KS (US)

(72) Inventors: Kevin A. Betts, Wichita, KS (US);
Douglas P. Looney, Andover, KS (US)

(73) Assignees: Kevin A. Betts, Wichita, KS (US);
Douglas P. Looney, Andover, KS (US)

( * ) Notice: Subject to any disclaimer, the term of this patent is extended or adjusted under 35 U.S.C. 154(b) by 312 days.

(21) Appl. No.: 16/389,187

(22) Filed: Apr. 19, 2019

(65) Prior Publication Data

US 2019/0263323 A1      Aug. 29, 2019

(51) Int. Cl.
*B60R 1/12* (2006.01)
*G02B 27/00* (2006.01)
*B60S 1/54* (2006.01)
*B60R 1/06* (2006.01)

(52) U.S. Cl.
CPC .............. *B60R 1/12* (2013.01); *B60R 1/06* (2013.01); *B60R 1/0602* (2013.01); *B60S 1/54* (2013.01); *G02B 27/0006* (2013.01)

(58) Field of Classification Search
CPC ........... B60R 1/12; B60R 1/0602; B60R 1/06; B60R 1/006; B60R 1/10; G02B 27/0006; G02B 5/09; B60S 1/54
See application file for complete search history.

(56) References Cited

U.S. PATENT DOCUMENTS

| | | | |
|---|---|---|---|
| 3,343,779 A * | 9/1967 | Beach, Jr | B60R 1/0605 248/488 |
| 4,134,612 A | 1/1979 | Nelson | |
| 4,268,120 A * | 5/1981 | Jitsumori | B60R 1/10 248/483 |
| 4,550,988 A | 11/1985 | Harder et al. | |

(Continued)

FOREIGN PATENT DOCUMENTS

| | | |
|---|---|---|
| DE | 3923947 | 1/1991 |
| DE | 19848980 | 4/2000 |

(Continued)

OTHER PUBLICATIONS

Seeclear.Eu, "Home: SeeClear Mirror Innovation", SeeClear, U.S. Publication, Aug. 21, 2015.

(Continued)

*Primary Examiner* — Kimberly N. Kakalec
(74) *Attorney, Agent, or Firm* — Hovey Williams LLP (57) ABSTRACT

A side view mirror incorporating a plurality of cylinders, each cylinder having a mirrored rear wall, a lateral wall and an oppositely lateral wall; an air scoop having lateral and oppositely lateral walls, the air scoops' lateral wall including one of the cylinders' oppositely lateral walls and the air scoop's oppositely lateral wall including another cylinder's lateral wall; the side view mirror further incorporating an air nozzle having an intake end communicating with the air scoop, wherein the air scoop has front and rear walls, wherein the air scoop's front wall includes the one of the (Continued)

cylinders' mirrored rear walls, and wherein the air scoop's rear wall includes the another cylinder's mirrored rear wall; the side view mirror further incorporating a brace interconnecting the one of the cylinders and the another cylinder.

18 Claims, 12 Drawing Sheets

(56) References Cited

U.S. PATENT DOCUMENTS

| | | | |
|---|---|---|---|
| 4,869,581 A | 9/1989 | Matulich | |
| 4,907,871 A * | 3/1990 | Hou | B60R 1/078 248/478 |
| 4,979,809 A | 12/1990 | Peters | |
| 5,179,470 A | 1/1993 | Olson | |
| 5,517,367 A * | 5/1996 | Kim | B60R 1/081 359/864 |
| 5,644,443 A * | 7/1997 | Hung | B60R 1/002 359/856 |
| 5,760,978 A * | 6/1998 | Smith | B60R 1/081 359/855 |
| 5,815,315 A | 9/1998 | Garland et al. | |
| 6,247,821 B1 * | 6/2001 | Brewster | B60R 1/10 359/841 |
| 6,749,306 B2 | 6/2004 | Lindsay | |
| 6,899,376 B1 | 5/2005 | Sullivan | |
| 8,167,442 B1 | 5/2012 | Hidden | |
| 2017/0015247 A1 | 1/2017 | Nguyen | |

FOREIGN PATENT DOCUMENTS

| | | |
|---|---|---|
| DE | 102011011412 | 8/2012 |
| GB | 2175552 | 12/1966 |
| GB | 1515834 | 6/1978 |
| GB | 2243586 | 6/1991 |
| GB | 2536533 | 9/2016 |
| KR | 200457976 | 1/2012 |
| WO | WO2004/014697 | 2/2004 |

OTHER PUBLICATIONS

Amazon.com, "Green Tec Multi Aero Vision", U.S. Publication, Oct. 8, 2014.

* cited by examiner

SIDE VIEW MIRROR

FIELD OF THE INVENTION

This invention relates to vehicle side view mirrors. More particularly, this invention relates to vehicle side view mirrors which incorporate and are structurally adapted for directing flows of air over the mirror's reflecting surfaces for wiping moisture and debris away from such surfaces.

BACKGROUND OF THE INVENTION

Vehicle side view mirrors which include structural adaptations intended for capturing and redirecting air coursing around the mirror to alternatively flow over the mirror's rearward reflecting surfaces are known. Such adaptations are commonly intended to perform a function of wiping moisture, snow, and debris off of the mirror's reflecting surfaces. However, such known mirror air flow adaptations are commonly structurally complex, they commonly fail to adequately integrate with the overall structure of the side view mirror, and they commonly inefficiently perform their reflecting surface clearing functions.

The instant inventive side view mirror solves or ameliorates the problems, defects, and deficiencies of such known air redirecting side view mirrors by specially configuring a side view mirror's housing and reflecting members to be laterally segmented, such segments being specially configured and spaced apart from each other for efficiently jetting air across the mirror's reflecting surfaces.

BRIEF SUMMARY OF THE INVENTION

A first structural component of the instant inventive side view mirror comprises a laterally segmented mirror housing. In the preferred embodiment, such segments define a series of vertically extending interstitial seams. The laterally segmented mirror housing comprises a plurality of segments which are configured to include a lateral-most or first segment and at least a first other segment which is positioned immediately oppositely laterally from the lateral-most segment.

Suitably, the mirror housing component may be further segmented to include a second oppositely lateral segment positioned immediately oppositely laterally from the housing's at least first oppositely lateral segment. In the preferred embodiment, each segment of the mirror's housing has lateral and oppositely lateral walls which are specially configured for air scooping functions, as described and explained below.

A further structural component of the instant inventive side view mirror comprises at least a first air scoop which is positioned between and resides between the lateral-most and at the least first oppositely lateral mirror housing segments. In the preferred embodiment, the at least first air scoop has angled lateral and oppositely lateral walls. The angled lateral wall of the at least first air scoop preferably comprises the oppositely lateral wall of the mirror housing's lateral-most segment, such air scoop's oppositely lateral wall correspondingly comprising the lateral wall of the mirror housing's at least first oppositely lateral segment. In a preferred embodiment, the laterally opposed walls of the at least first air scoop form a "V" shaped valley which acts as a funnel which may capture and compress ambient air as the inventive mirror moves forwardly over a roadway.

Where the oppositely lateral-most housing segment of the instant inventive side view mirror comprises a second oppositely lateral segment, a second air scoop is advantageously similarly formed by the respective lateral and oppositely lateral walls of the at least first oppositely lateral housing segment and such second oppositely lateral housing segment.

A further structural component of the instant inventive side view mirror comprises a segmented reflecting mirror which incorporates a lateral segment and at least a first oppositely lateral segment. Suitably, where the side view mirror's housing incorporates a second oppositely lateral segment, the segmented mirror component further incorporates a second oppositely lateral segment. In the preferred embodiment, the mirror's segments are spaced apart from each other to form interstitial air nozzles or air outlets. In the preferred embodiment, such formed air nozzles or air outlets have inlet ends which are positioned at the open vertices of the mirror's "V" shaped air scoops. Also in the preferred embodiment, the nozzles or outlets are shaped and directed to direct jets of air over the flat reflecting surfaces of the mirror's segments.

In operation of the instant inventive side view mirror, forward movement of the mirror through the air causes air to be collected in the forwardly flared "V" shaped valleys. Such air compresses and emits at the open rearward vertices of the air scoops to enter the inlet ends of the air outlets or nozzles which are formed at spaces or seams between the mirror's segments. Thereafter, the compressed air jets oppositely laterally over the flat reflecting surfaces of the mirror segments, effectively and advantageously wiping dirt, moisture, and snow away from the reflecting surfaces.

Accordingly, objects of the instant invention include the provision and configuration of a side view mirror which incorporates structures as described above, and which arranges those structures in relation to each other in the manners described above, in order to achieve the beneficial functions described above.

Other and further objects, benefits, and advantages of the instant invention will become known to those skilled in the art upon review of the Detailed Description which follows, and upon review of the appended drawings.

DETAILED DESCRIPTION OF PREFERRED EMBODIMENTS

Figure 1:
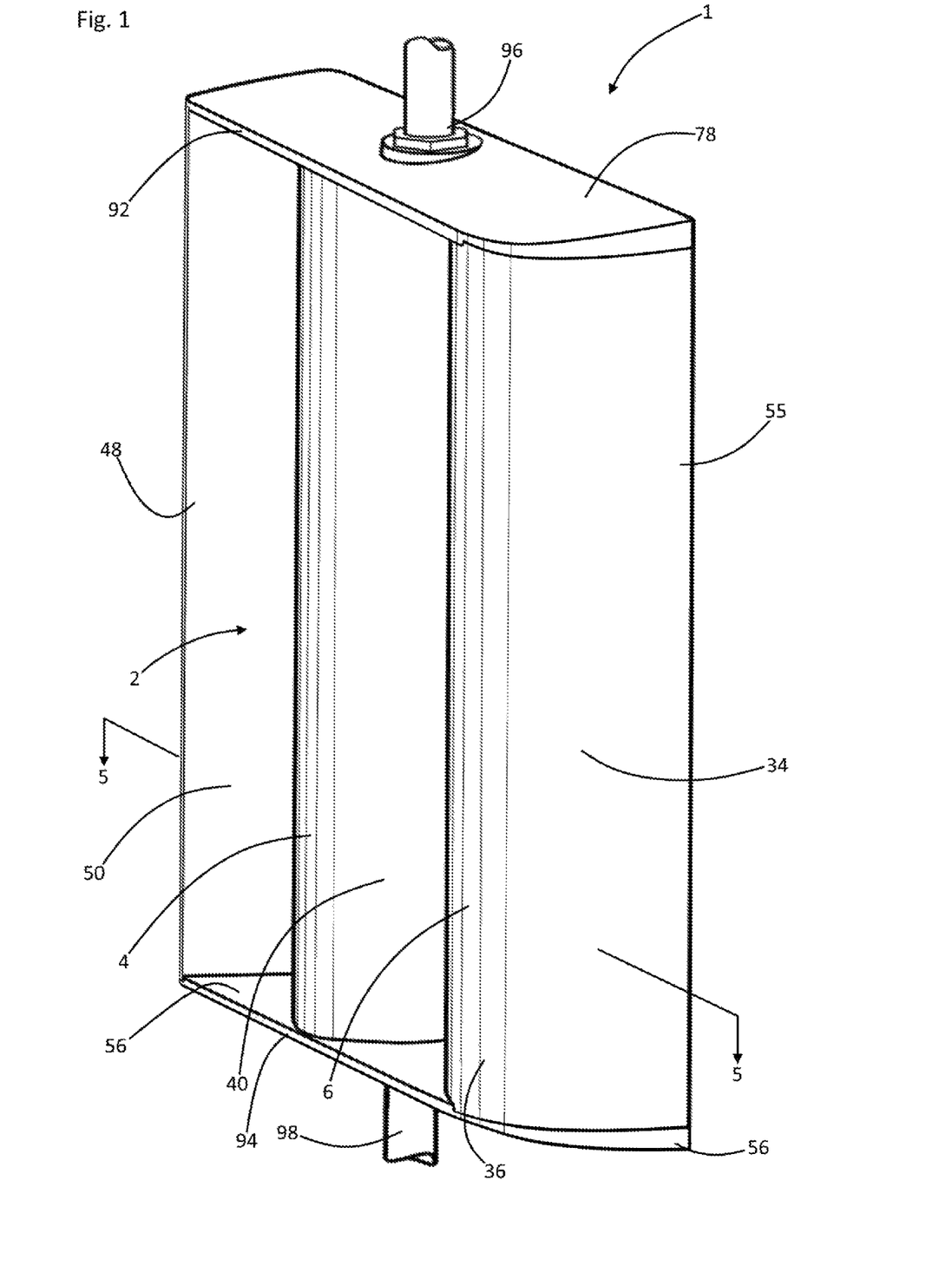
FIG. 1 is a front perspective view of a preferred embodiment of the instant inventive side view mirror.
Figure 2:
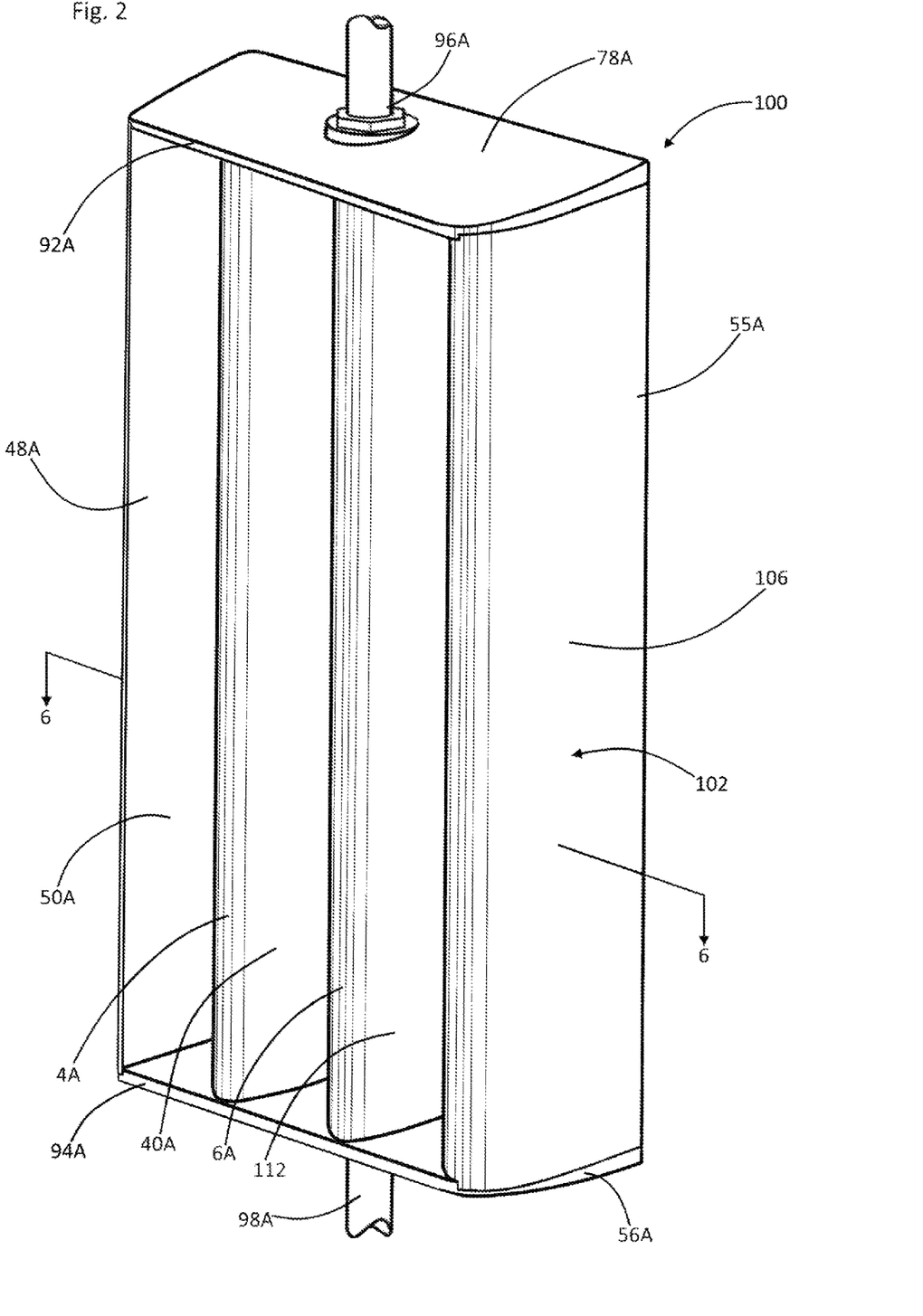
FIG. 2 presents an alternate configuration of the mirror of FIG. 1.

Referring now to the drawings, and in particular to Drawing FIG. 1, a preferred embodiment of the instant inventive side view mirror is referred to generally by Reference Arrow 1. The side mirror 1 comprises a housing which is referred to generally by Reference Arrow 2. The housing 2 is preferably laterally segmented comprising at least a first segment or lateral-most segment 4. The housing 2 further comprises at least a first oppositely lateral segment 6, such segment suitably constituting the oppositely lateral-most segment of the housing 2.

Referring simultaneously to FIGS. 1, 3, 5, 10, and 11, the housing segment 4 of the side view mirror 1 is preferably configured and fabricated as a vertically oblongated extrusion molded member which is suitably composed of durable plastic or aluminum. In their preferred extrusion molded configurations, the housing segments 4 and 6 comprise non-circular cylinder structures. Accordingly, the housing's lateral segment 4 constitutes a first cylinder among the plurality of cylindrical segments 4 and 6, and the housing's at least first oppositely lateral housing segment 6 (i.e., another cylinder among such plurality of cylinders) constitutes a second or oppositely lateral cylinder segment. The housing's lateral segment 4 has a lateral wall 8, an oppositely lateral wall 16, an arcuately curved front end 12, a substantially flat or planar rear wall 14, an upper end 17, a lower end 18, and a hollow interior space or bore 20. In the preferred embodiment, the rear wall 14 of cylinder segment 4 forms and presents a mirror mounting land 22. Other housing segments of the inventive side view mirror 1 (e.g., segment 6) are preferably configured similarly with the lateral cylindrically configured segment 4.

A further structural component of the instant inventive side view mirror comprises a reflecting mirror which is referred to generally by Reference Arrow 23, such mirror including segments 24 and 26. The lateral-most mirror segment 24 of the mirror 23 is preferably adhesively bonded to the rear wall 14 of the lateral cylindrical segment 4, such mirror 24 being supported upon the mirror mounting land 22. The mirror's oppositely lateral segment 26 is similarly adhesively mounted to mounting land 28 which is formed at the rear face of the rear wall 30 of the oppositely lateral housing segment 6. Similarly with lateral mirror housing segment 4, the oppositely lateral mirror housing 6 is preferably configured as a cylindrical extrusion which includes a lateral wall 32, an arcuately curved front end 36, an oppositely lateral wall 34, and a hollow interior bore 36.

Figure 3:
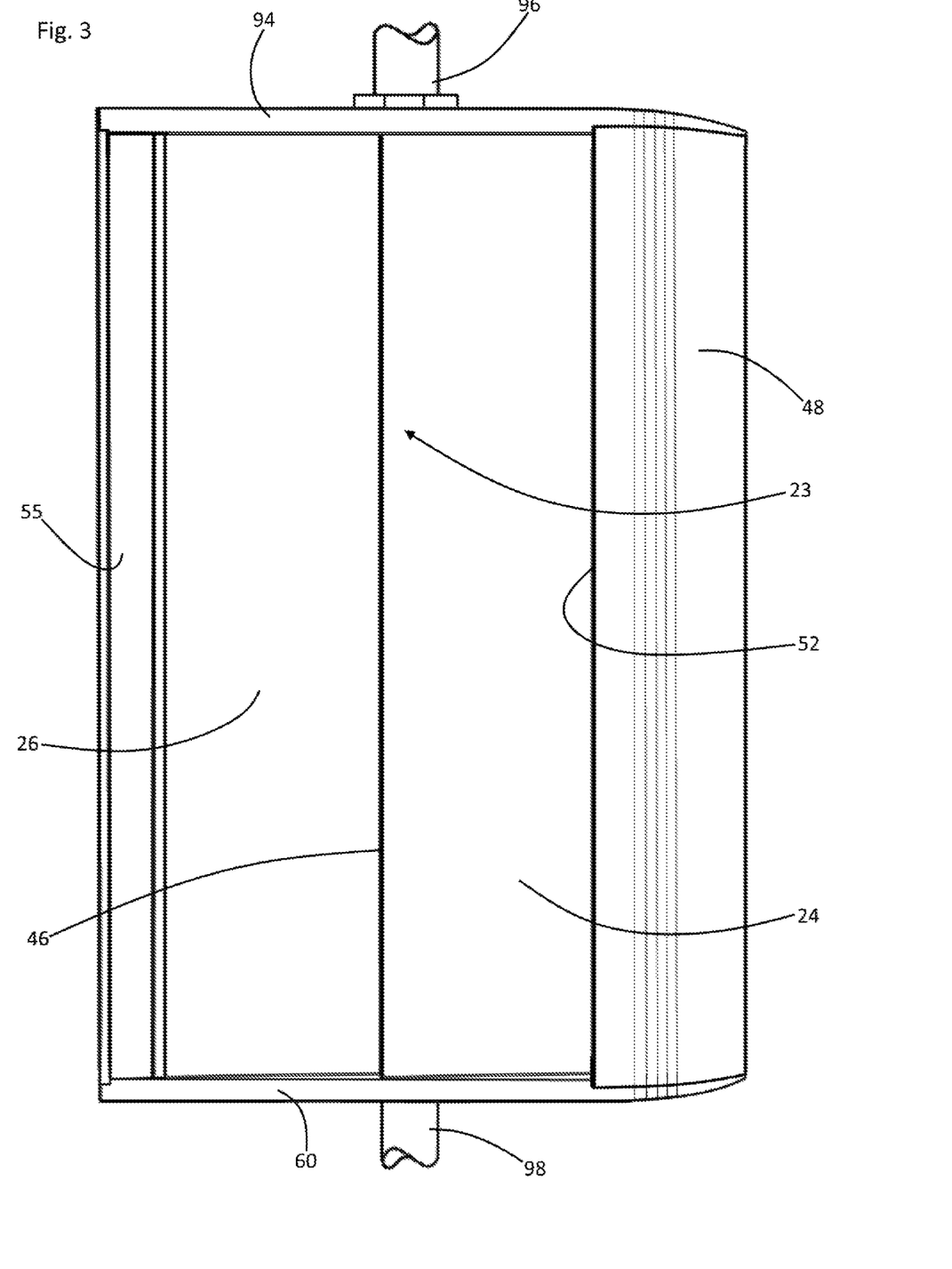
FIG. 3 is a rear view of the mirror of FIG. 1.
Figure 4:
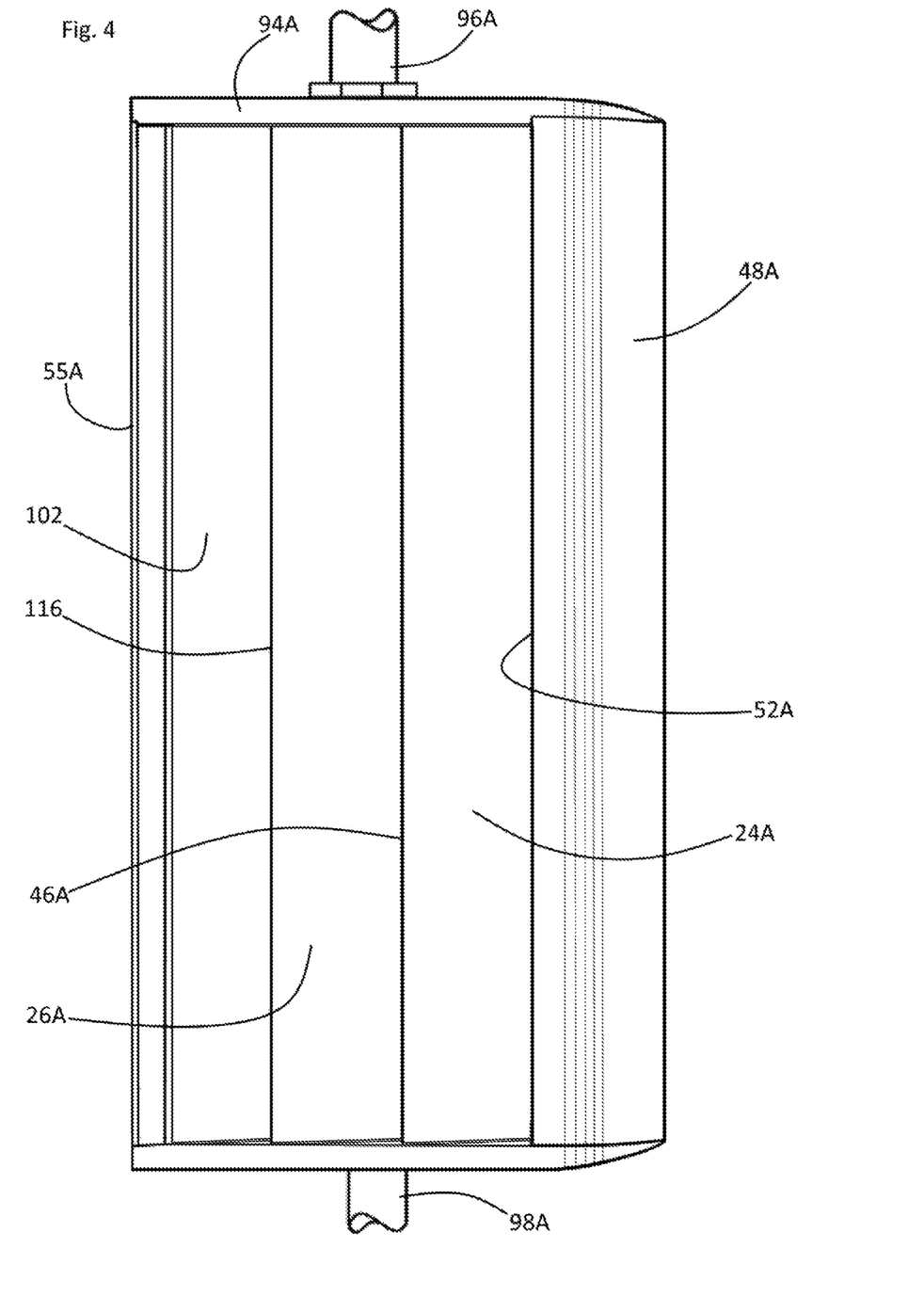
FIG. 4 is a rear view of the mirror of FIG. 2.
Figure 5:
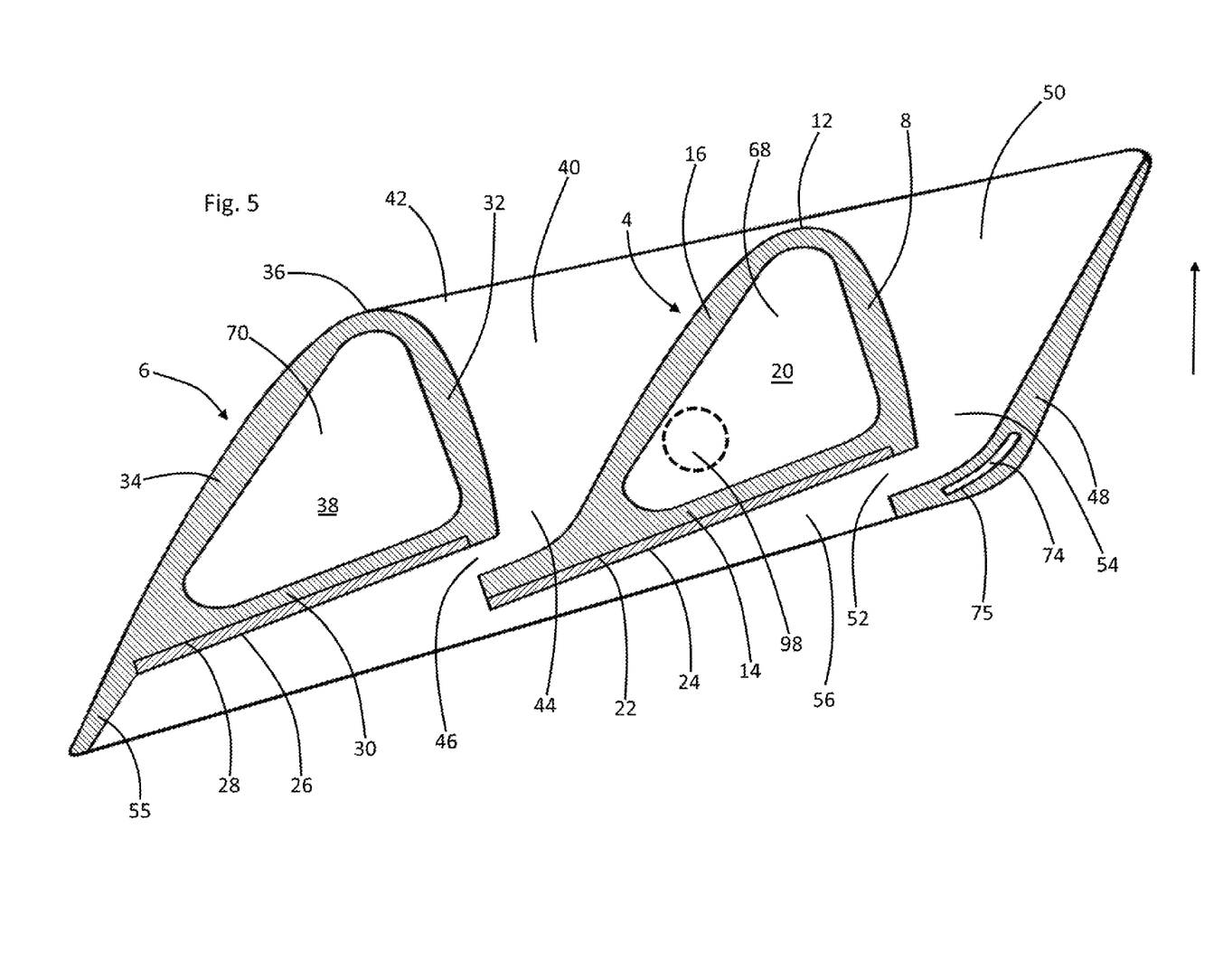
FIG. 5 is a sectional view as indicated in FIG. 1.

Referring simultaneously to FIGS. 1, 3, and 5, the instant inventive side view mirror 1 preferably further comprises at least a first "V" valley shaped air scoop 40 having a forwardly opening front end 42, and having an open rear vertex 44. In the preferred embodiment, such air scoop 40 is formed by lateral and oppositely lateral walls wherein the lateral wall of the air scoop 40 comprises the oppositely lateral wall 16 of the lateral cylindrical segment 4, and wherein the oppositely lateral wall of the air scoop 40 comprises the lateral wall 32 of the oppositely lateral cylindrical housing segment 6. For enhancement of air flow, it is preferred that the outer surface of the air scoop's lateral wall 16 be convexly oppositely laterally curved, and that the outer surface of the air scoop's oppositely lateral wall 32 correspondingly curve convexly in the lateral direction.

A further structural component of the instant inventive side view mirror comprises at least a first air outlet or air nozzle 46 which comprises a component which interstitially resides between the rear walls 14 and 30 of cylindrical housing segments 4 and 6. Such nozzle 46 has a lateral inlet end which communicates with vertex 44, and has an outlet end which is oppositely laterally oriented for jetting air across the rearward reflecting surface of the plate mirror 26. The direction of nozzle 46 preferably substantially parallels the plane of mirror 26.

In operation of the instant inventive side view mirror 1, referring in particular to FIG. 5, as the mirror travels forwardly in the direction of the arrow drawn upon FIG. 5, windward air in front of the mirror 1 collects within air scoop 40 and is compressed by walls 16 and 32 in the manner of a funnel toward the vertex 44. Compressed air at the vertex 44 enters nozzle 46 and emits oppositely laterally, jetting across the rear reflecting face of mirror segment 26. Water droplets, snow, and debris which might otherwise undesirably collect upon the reflecting face of mirror segment 26 are advantageously driven by the oppositely laterally traveling air jet away from the mirror's reflecting surface.

Referring to FIGS. 1, 3, and 5, the instant inventive side view mirror 1 preferably further comprises at least a first air vane 48 which is positioned laterally from the first cylindrical housing segment 4. In combination with such segment 4, the at least first air vane 48 advantageously forms and defines a second air scoop 50. The lateral wall of the second air scoop 50 preferably comprises the at least first air vane 48, and the oppositely lateral wall of such air scoop correspondingly comprises the lateral wall 8 of cylindrical segment 4.

The rear wall 14 of the lateral-most cylindrical segment 4 in combination with the rearward end of the air vane 48 forms a second air outlet or nozzle 52. In operation, such nozzle 52 jets compressed air from the vertex 54 of the second air scoop 50 oppositely laterally across the reflecting face of mirror 24.

In the preferred embodiment, a second air vane 55 extends rearwardly and oppositely laterally from the extreme oppositely lateral end of the oppositely lateral housing segment 6. In operation, such second air vane 55 assures that air which is jetted from nozzle 46 forcefully traverses the entire reflecting face of mirror 26 for completely clearing moisture droplets and snow.

Figure 7:
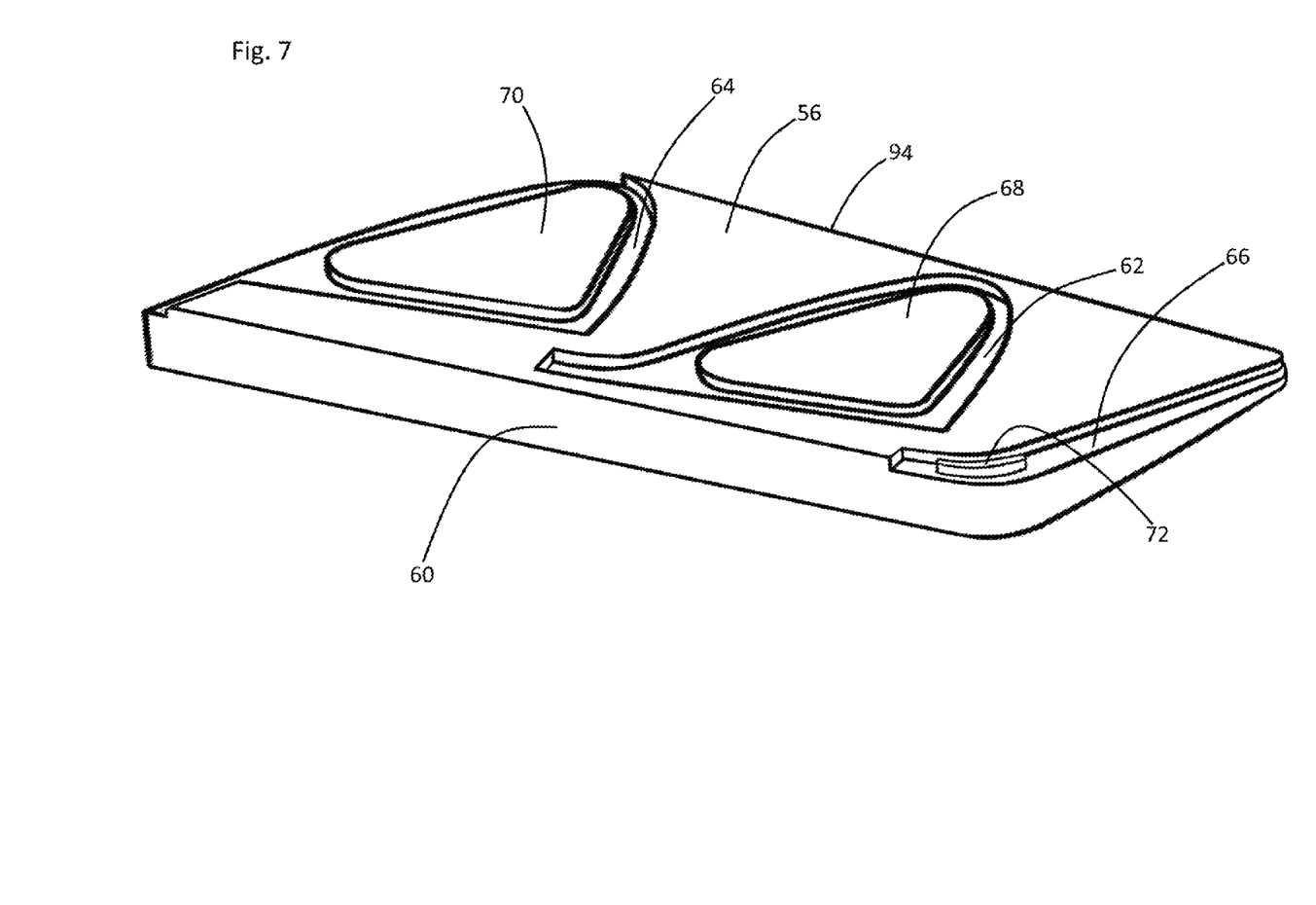
FIG. 7 is a perspective view of a lower brace plate component of the side view mirror of FIG. 1.

At least a first cross brace structure is preferably provided for rigidly interconnecting the housing's cylindrical segments 4 and 6. Preferably, a pair of such brace structures or upper and lower braces are provided in order to ascribe to the side view mirror a rigid box frame structure. In the preferred embodiment, the lower brace among the preferred pair of braces is configured as a plate 56. For purposes of reduction of air drag, the plate 56 preferably has a relatively narrow or thin front end 94, and has a flared or relatively thick rearward end 60. Referring to FIG. 7, the plate 56 preferably incorporates upwardly opening sockets 62, 64, and 66, which respectively match the profiles of, and receive the lower ends of, cylindrical segment 4, cylindrical segment 6, and air vane 48. For additional security in mounting of the lower ends of the cylinder and vane components, pins 68, 70, and 72 extend upwardly from plate 56, such pins respectively matching the inner profiles of, and nestingly extending into the downwardly opening hollow bores 20, 38, and 75 of the cylindrical segments 4 and 6, and of the air vane 48. In the preferred embodiment, the lower ends of the cylindrical segments 4 and 6, and of vane 48, are adhesively bonded at their nestingly received positions within upwardly opening sockets 62, 64, and 66. Other means of rigidly interconnecting the air vane 48 and the cylinder segments 4 and 6 to plate 56, such as whole formations and welding are considered to fall within the scope of the invention.

Figure 8:
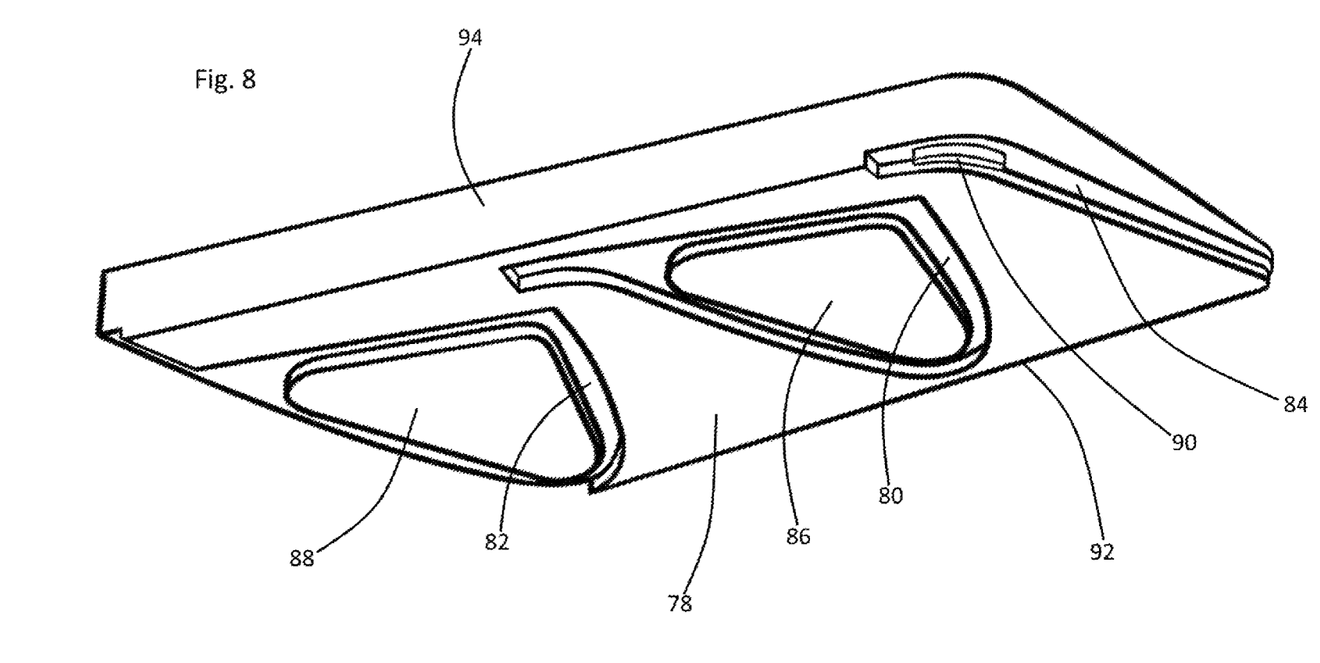
FIG. 8 is a perspective view of an upper brace plate component of the side view mirror of FIG. 1.

Referring further simultaneously to FIG. 8, an upper plate configured brace 78 is preferably provided, such plate 78 vertically mirroring plate 56. Similarly with plate 56, plate 78 has downwardly opening sockets 80, 82, and 84, and presents downwardly extending pins 86, 88, and 90. Also similarly with plate 56, plate 78 has a relatively narrow or thin front end 92 and a flared or widened rearward end 94. In the preferred embodiment, downwardly opening sockets 80, 82, and 84 nestingly receive the upper ends of cylindrical segments 4,6, and of the upper end of air vane 48 for secure adhesive bonding.

At least a first swivel mount 96 is preferably provided for adjustably mounting the side view mirror 1 upon a vehicle such as a truck (not depicted within views), and preferably a lower swivel mount 98 is additionally provided.

Referring simultaneously to FIGS. 1-10, structures appearing in Drawing FIGS. 2, 4, 6, 9, and 10 which are identified by a reference numeral having the suffix "A" are configured substantially identically with similarly numbered structures appearing in Drawing FIGS. 1, 3, 5, 7, and 8.

Figure 6:
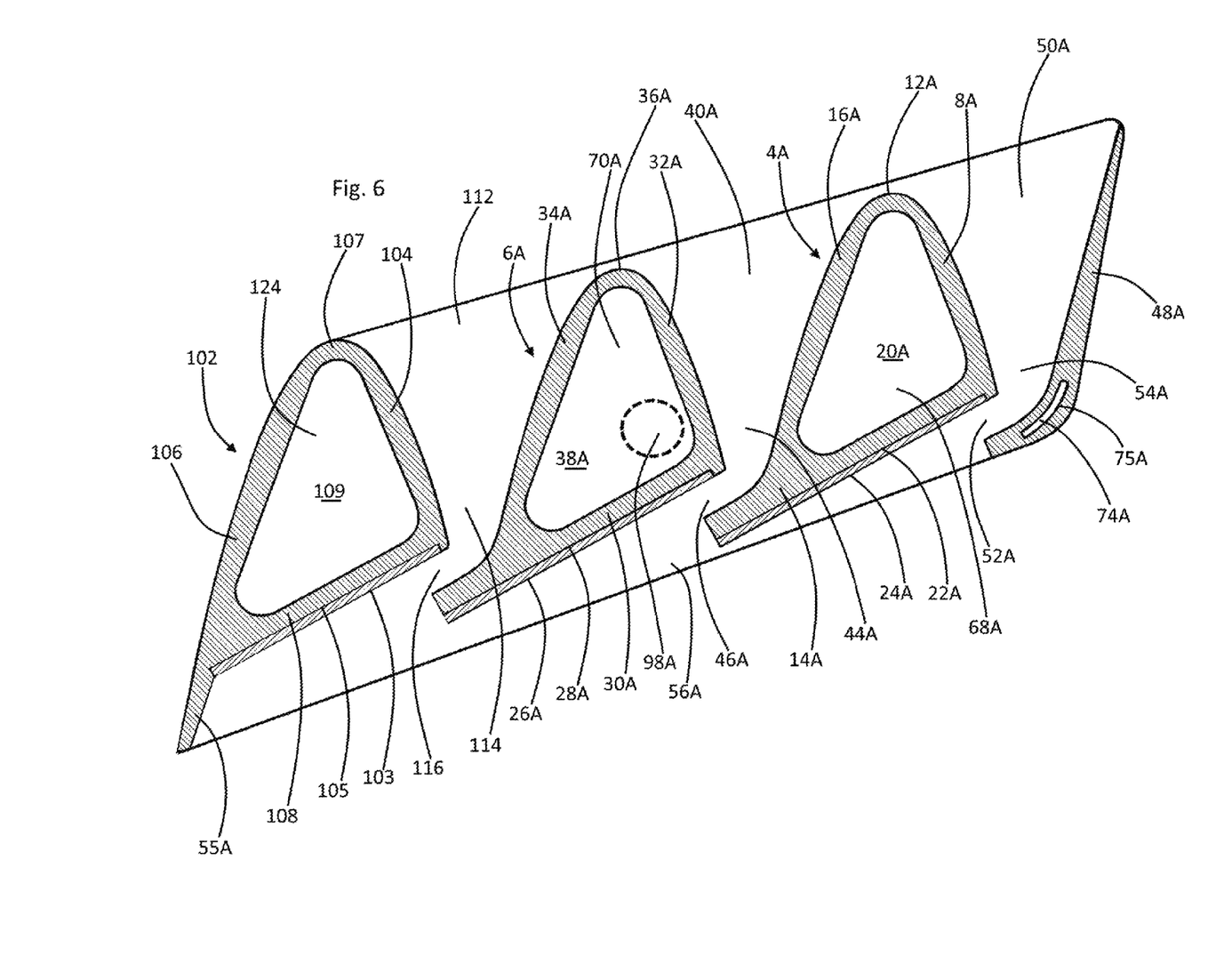
FIG. 6 is a sectional view as indicated in FIG. 2.

In the alternate configuration 100 of Drawing FIGS. 2, 4, 6, 9, and 10, another, second other, or additional cylindrical housing segment is referred to generally by Reference Arrow 102. Correspondingly, a second other oppositely lateral mirror segment is provided, such segment being identified by Reference Numeral 103. Similarly with cylindrical housing segments 4A and 6A, the additional and oppositely laterally positioned cylindrical housing segment 102 has arcuately curved lateral and oppositely lateral walls 104 and 106, has a hollow interior 109, and has rear wall 108 whose rear face forms a land 105 for supporting the adhesively mounted oppositely lateral mirror segment 103. As shown in FIG. 6, walls 104 and 34A form and define a third or oppositely lateral-most "V" channel configured air scoop 112 having a rear vertex 114. Air compressed within vertex 114 spills into a third or oppositely lateral-most air nozzle 116 to jet across mirror segment 103. The FIGS. 2, 4, 6, 9, and 10 configuration of the instant inventive side view mirror operates and functions similarly with mirror 1, as described above.

Figure 9:
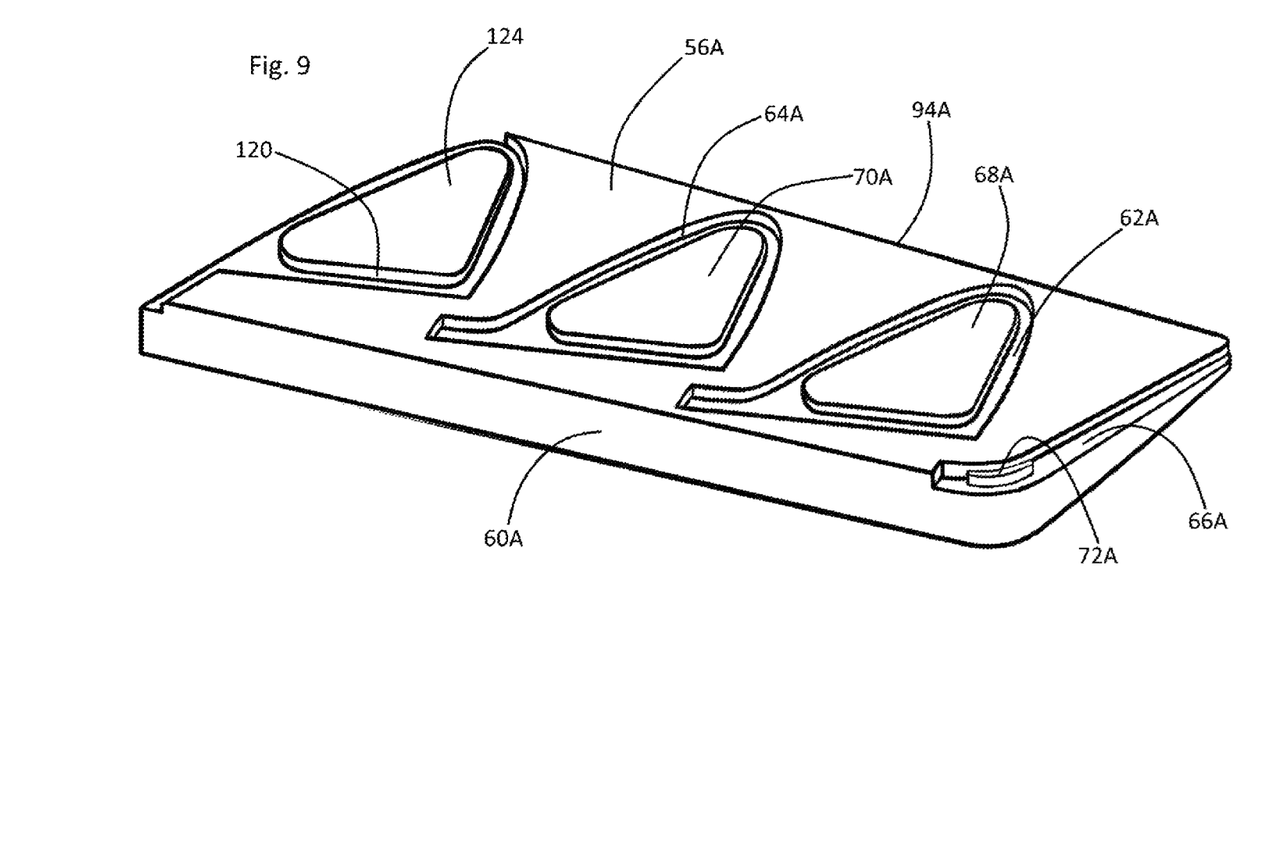
FIG. 9 is a perspective view of a lower brace plate component of the side view mirror of FIG. 2.
Figure 10:
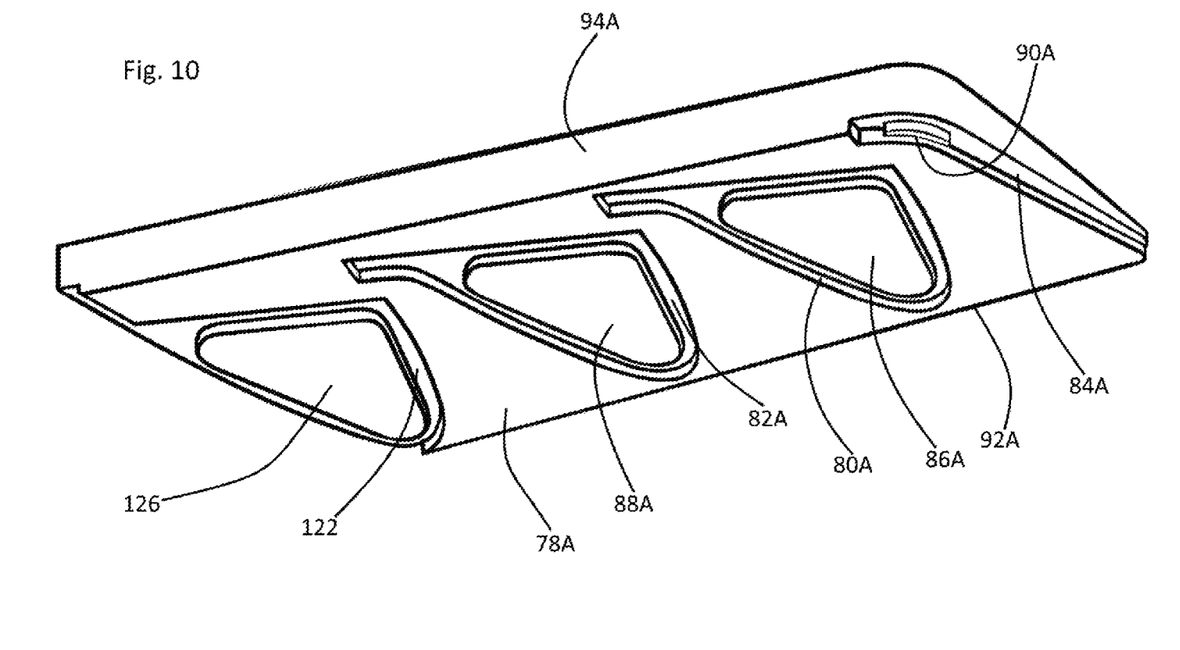
FIG. 10 is a perspective view of an upper brace plate component of the side view mirror of FIG. 2.
Figure 11:
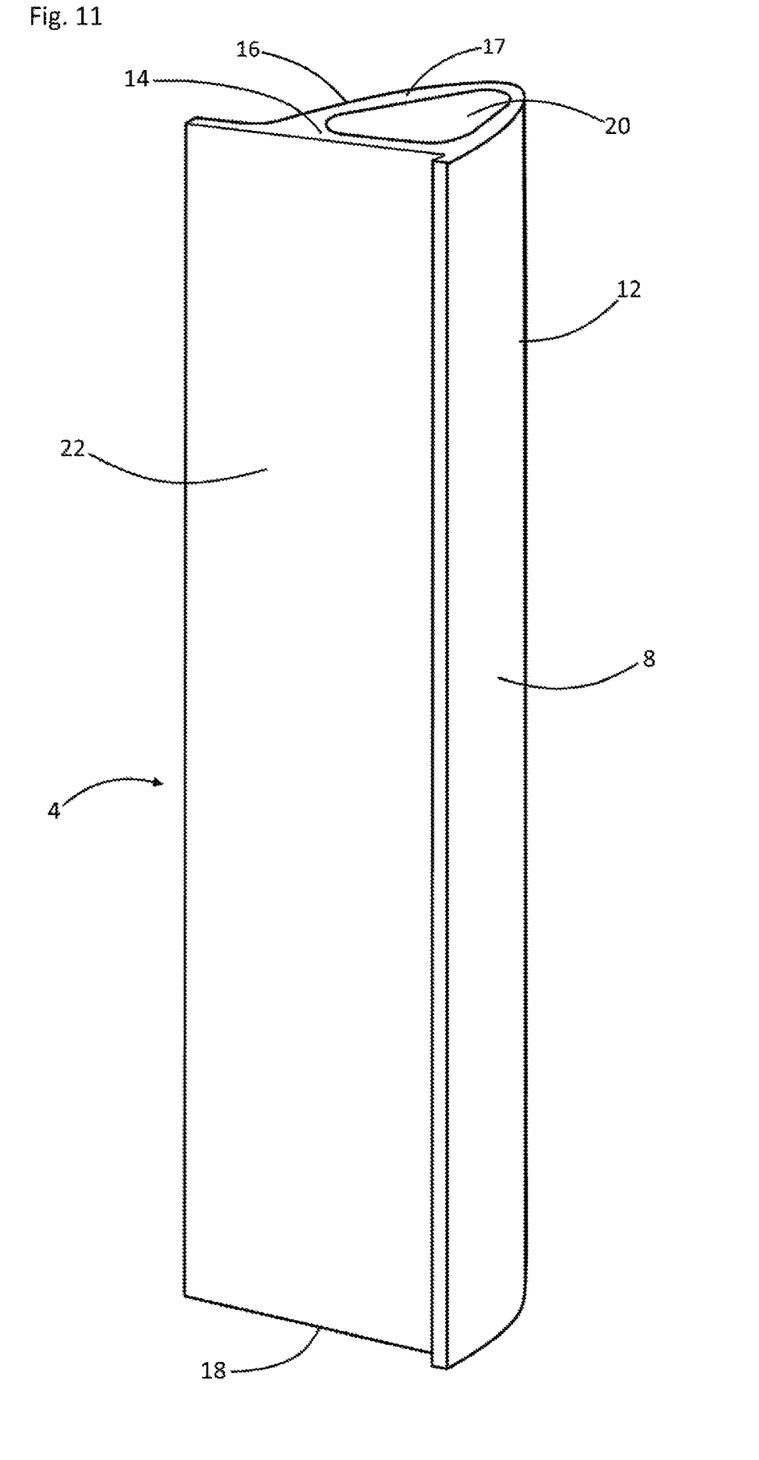
FIG. 11 depicts one of the cylindrical segments of the side view mirror of FIG. 1.
Figure 12:
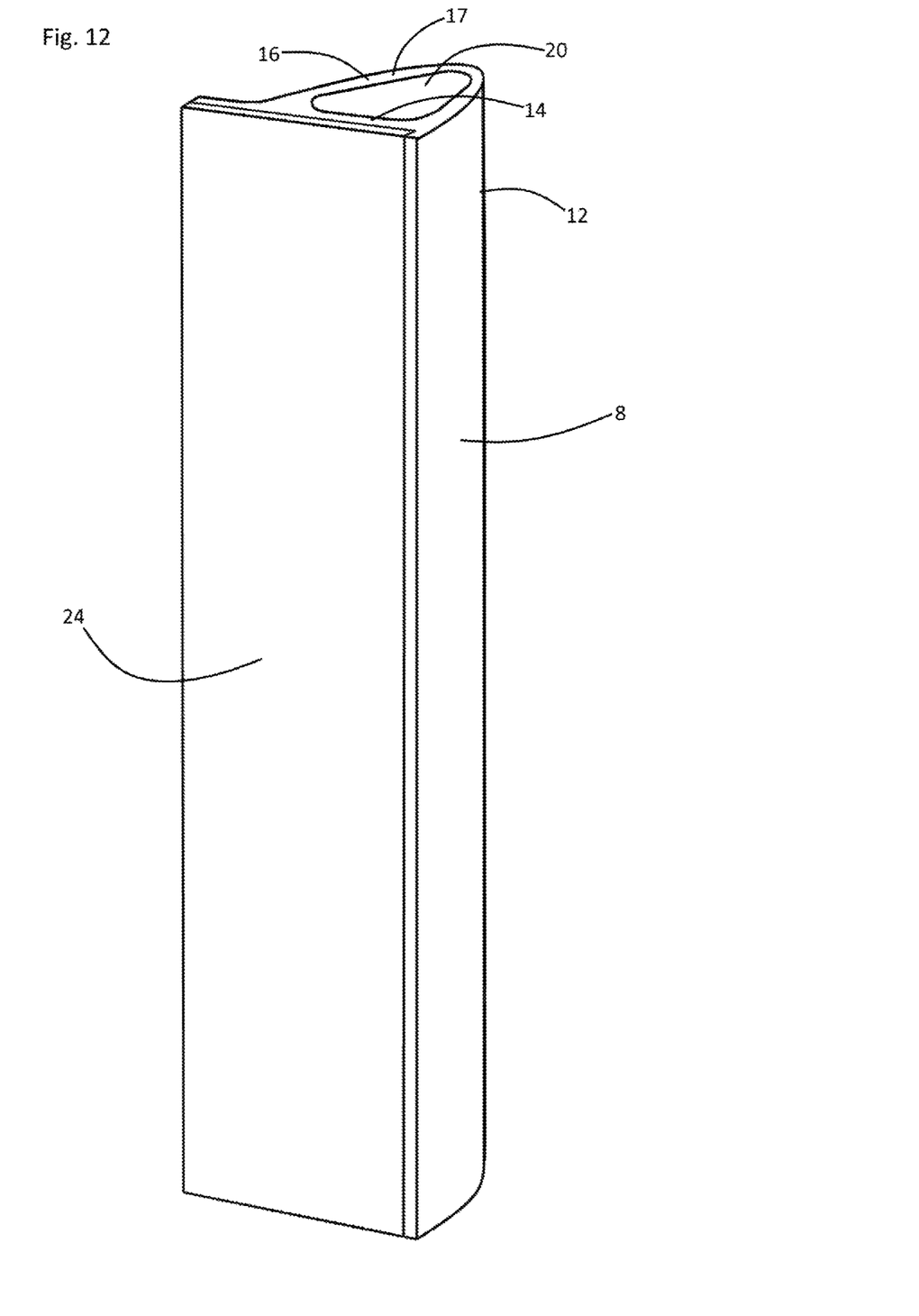
FIG. 12 redepicts the structure of FIG. 11, the view of FIG. 12 further showing an adhesively mounted reflecting mirror plate.

The alternative brace plates 56A and 78A include additional closely formed sockets 120 and 122 and pins 124 and 126 for securely receiving and mounting the upper and lower ends of the additional cylindrical segment 102. All mirror segments 24A, 26A, and 103 are preferably parallel and, according to the scope of the invention, the plurality of cylindrical housing segments may include more than three of such segments.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A side view mirror comprising:
   (a) a plurality of cylinders, each cylinder having a mirrored rear wall, a lateral wall and an oppositely lateral wall;
   (b) at least a first frontwardly opening air scoop having lateral and oppositely lateral walls, the at least first air scoop's lateral wall comprising one of the cylinders' oppositely lateral walls, and the at least first air scoop's oppositely lateral wall comprising another one of the cylinders' lateral walls;
   (c) at least a first air nozzle having an intake end communicating with at least first air scoop, the at least first air nozzle having front and rear walls, wherein said air nozzle's front wall comprises the one of the cylinders' mirrored rear walls, and wherein said air nozzle's rear wall comprises the another one of the cylinders' mirrored rear walls; and
   (d) at least a first brace interconnecting the one of the cylinders and the another one of the cylinders.

2. The side view mirror of claim 1 wherein the at least first frontwardly opening air scoop has a rearwardly opening vertex, the intake end of the at least first air nozzle being positioned at said vertex.

3. The side view mirror of claim 2 wherein the mirrored rear wall of the one of the cylinders comprises a planar surface, wherein the mirrored rear wall of the another one of the cylinders comprises another planar surface, and wherein said planar surfaces substantially parallel each other.

4. The side view mirror of claim 3 wherein the at least first air nozzle has an oppositely lateral extension adapted for oppositely laterally jetting air.

5. The side view mirror of claim 4 wherein the at least first air nozzle's oppositely lateral extension substantially parallels the another one of the cylinders' planar mirrored rear walls.

6. The side view mirror of claim 5 wherein each cylinder has an upper end and a lower end, and wherein the at least first brace is positioned either at the cylinders' upper ends or at the cylinders' lower ends.

7. The side view mirror of claim 6 further comprising a second brace further interconnecting the one of the cylinders and the another one of the cylinders, the second brace being positioned either above the least first brace or below the at least first brace.

8. The side view mirror of claim 7 wherein each brace comprises a plate.

9. The side view mirror of claim 8 wherein each plate has a front end and a rear end, each plate's rear end being vertically flared.

10. The side view mirror of claim 1 wherein the at least first air scoop's lateral wall is oppositely laterally convexly curved, and wherein said air scoop's oppositely lateral wall is laterally convexly curved.

11. The side view mirror of claim 10 comprising a first air vane positioned laterally from the one of the cylinders, and further comprising a second frontwardly opening air scoop having lateral and oppositely lateral walls, said second air scoop's lateral wall comprising the first air vane, and said second air scoop's oppositely lateral wall comprising the lateral wall of the one of the cylinders.

12. The side view mirror of claim 11 wherein each cylinder comprises a vertically oblongated extrusion.

13. The side view mirror of claim 11 wherein the plurality of cylinders comprises a second other one of the cylinders, said cylinder being positioned oppositely laterally from the another one of the cylinders, and further comprising a third air scoop positioned between the another one of the cylinders and the second other one of the cylinders.

14. The side view mirror of claim 13 wherein each cylinder's rear wall presents a mirror mounting land, and wherein said each mirror's rear wall comprises a glass mirror, said mirror being adhesively bonded to said land.

15. The side view mirror of claim 14 further comprising at least a first swivel mount connected operatively to one of the plates.

16. The side view mirror of claim 15 wherein each cylinder has an upper end and a lower end, wherein each plate has an upper surface and a lower surface, and further comprising a plurality of pin and socket joints, wherein each of said joints' pins comprises one of the ends among the cylinders' upper and lower ends, and wherein each of said joints' sockets opens at one of the surfaces among the plates' upper and lower surfaces.

17. The side view mirror of claim 15 wherein each cylinder has an upper end and a lower end, wherein each plate has an upper surface and a lower surface, and further comprising a plurality of pin and socket joints, wherein each of said joints' pins extends from one of the surfaces among the plates' upper and lower surfaces, and wherein each of said joints' sockets opens at one of the ends among the cylinders' upper and lower ends.

18. The side view mirror of claim 11 wherein the plurality of cylinders comprises an oppositely lateral-most cylinder having an oppositely lateral end, and further comprising a second air vane extending rearwardly from said end.

* * * * *